MOTOR-DRIVEN OPERATING MECHANISM FOR CIRCUIT BREAKER

Filed March 3, 1969 8 Sheets-Sheet 1

INVENTORS
DAVID B. POWELL,
RODNEY L. NAAS

BY Robert S. Smith
ATTORNEY

Jan. 26, 1971 D. B. POWELL ET AL 3,559,121

MOTOR-DRIVEN OPERATING MECHANISM FOR CIRCUIT BREAKER

Filed March 3, 1969 8 Sheets-Sheet 2

INVENTORS
DAVID B. POWELL,
RODNEY L. NAAS
BY Robert S. Smith
ATTORNEY

MOTOR-DRIVEN OPERATING MECHANISM FOR CIRCUIT BREAKER

Filed March 3, 1969 8 Sheets-Sheet 3

INVENTORS
DAVID B. POWELL,
RODNEY L. NAAS
BY
ATTORNEY

INVENTORS
DAVID B. POWELL,
RODNEY L. NAAS
BY Robert S. Smith
ATTORNEY

INVENTORS
DAVID B. POWELL,
RODNEY L. NARS
BY Robert S. Smith
ATTORNEY

Jan. 26, 1971 D. B. POWELL ET AL 3,559,121

MOTOR-DRIVEN OPERATING MECHANISM FOR CIRCUIT BREAKER

Filed March 3, 1969 8 Sheets-Sheet 6

INVENTORS
DAVID B. POWELL,
RODNEY L. NAAS

BY [signature]

ATTORNEY

INVENTORS
DAVID B. POWELL,
RODNEY L. NAAS
BY Robert S. Smith
ATTORNEY

MOTOR-DRIVEN OPERATING MECHANISM FOR CIRCUIT BREAKER

Filed March 3, 1969 8 Sheets-Sheet 8

INVENTORS
DAVID B. POWELL
RODNEY L. NAAS
BY Robert S. Smith
ATTORNEY

United States Patent Office 3,559,121
Patented Jan. 26, 1971

3,559,121

MOTOR-DRIVEN OPERATING MECHANISM FOR CIRCUIT BREAKER

David B. Powell, Bristol, and Rodney L. Naas, Plainville, Conn., assignors to General Electric Company, a corporation of New York Filed Mar. 3, 1969, Ser. No. 810,905
Int. Cl. H01h 3/22
U.S. Cl. 335—68 12 Claims

ABSTRACT OF THE DISCLOSURE

An electrical switching device of the toggle type having motor-driven means to extend, a tension spring assembly and hook means for securing a movable contact arm in an open position against the extended spring. The motor-driven means if thereafter retracted and release of the contact arm hook means causes rapid positive engagement of the contacts. Emergency manually operable means is also provided.

BACKGROUND OF THE INVENTION (1) Field of the invention

This invention relates to electric switching devices of the type including motor-driven operating mechanisms, and more particularly to electric circuit breakers of this type of substantial current-carrying capacity which require relatively large contacts, operate at high speed, and exert high contact pressure. The invention further relates to motor-driven switching devices of the nature which include emergency manually operable means.

(2) Description of the prior art

One type of electrically operated circuit breaker known to the prior art includes a basic device comprising a molded-case electric circuit breaker having a manually operable handle, combined with operating means for storage of mechanical energy for the purpose of moving the electrical contacts to the closed position when the stored energy is released. (It is desirable to quickly and positively drive the switching contacts from the open to the closed position and vice-versa during switching operations to minimize arcing.)

Such prior art includes Pat. No. 3,343,109 dated Sept. 19, 1967, Charles L. Jencks and George W. Kiesel assigned to the same assignee as the present application. The Jencks and Kiesel patent discloses a circuit-breaker assembly in which manual means is provided for operating an electrical switching device from open to closed condition, the operating means including a tension type spring. Latching means is provided which, when released, causes the spring to open the contact arm. An improvement by the same inventors with the same assignee is described in Pat. 3,382,331 dated May 7, 1968. This patent pertains to locking means for limiting motion of a rotating cam which drives the electrical switching device.

As the operating current range of this type of circuit breaker increases, increasingly more stored energy is required to operate it. In electric motor driven forms, various means for increasing the mechanical advantage of the mechanism have been employed in conjunction with an electric motor with a clutch to disconnect the motor from the spring-charging mechanism after the springs have been charged. These clutches are costly to make and often require critical adjustment.

The manual operating methods in the above-mentioned prior art patents have no provision for closing the circuit-breaker contacts selectively at a precise predeterminable instant, such as when it is desired to connect a load in electrically phased relationship.

OBJECTS OF THE INVENTION

An object of our invention is to provide a new and improved motor-operated circuit breaker with minimum modification of a manually operated circuit breaker of comparable current rating.

Another object of the invention is to provide a simple manually operated circuit breaker which can be selectively closed at a particular instant.

It is a general object of the invention to provide an inexpensive and highly reliable motor-operated circuit-breaker mechanism.

SUMMARY OF THE INVENTION

In accordance with one form of the invention which attains the foregoing objects, a multipole circuit breaker is provided including an electric circuit breaker having a support, a fixed contact mounted on the support, a movable contact arm pivoted on the support, a movable contact on the movable contact arm for engagement with the fixed contact, and an operating mechanism. The movable contact arm is movable into closed position with its contact in engagement with the fixed contact and into an open position away therefrom. The operating mechanism includes latch means operable to cause automatic opening of the contacts and a releasable member with pivotal mounting on the support which engages the latch means. A two-link toggle linkage connects the releasable member at a point spaced apart from the pivot point of the releasable member and the movable contact arm of the circuit breaker. Pivotally mounted hook means engageable with the movable contact arm is provided to hold said movable contact arm against the forces produced by a tension spring. The tension spring has one end fixedly mounted on the support and its other ending engaged with said toggle linkage and biases the toggle linkage to the closed contact position while the releasable member is in its latched position. At the same time, the spring also biases the releasable member away from the fixed contact upon release of the releasable means. Resetting means is provided (1) for moving the toggle linkage and releasable member against the action of the spring to engage the releasable member with the latch means while the hook means remains in the hooked position and (2) for releasing the toggle linkage after the releasable member is returned to the latched position. The resetting means includes a lever pivotally mounted on the support within the enclosure at one end and operable upon pivoting about one end thereof. The other end of the resetting lever engages the pivot pin of said toggle linkage for movement of the toggle linkage and of the releasable member to engage the latch means and the hook means. The resetting means further includes means for releasing the hook means after engagement of the releasable member to rotate said contact arm rapidly to the closed position under the action of said spring.

In accordance with another form of the invention, the pivotally mounted lever utilized in the resetting means is engaged by a roller mounted on a carriage constrained to move substantially rectilinearly. The engagement of the roller and lever is at a point spaced apart from the pivotal mounting of the lever. The carriage is driven by electric motors through gearing to cause the roller to pivot the lever.

BRIEF DESCRIPTION OF THE DRAWING

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawings, in which:

DESCRIPTION OF THE PREFERRED EMBODIMENT

Figures 1, 2:
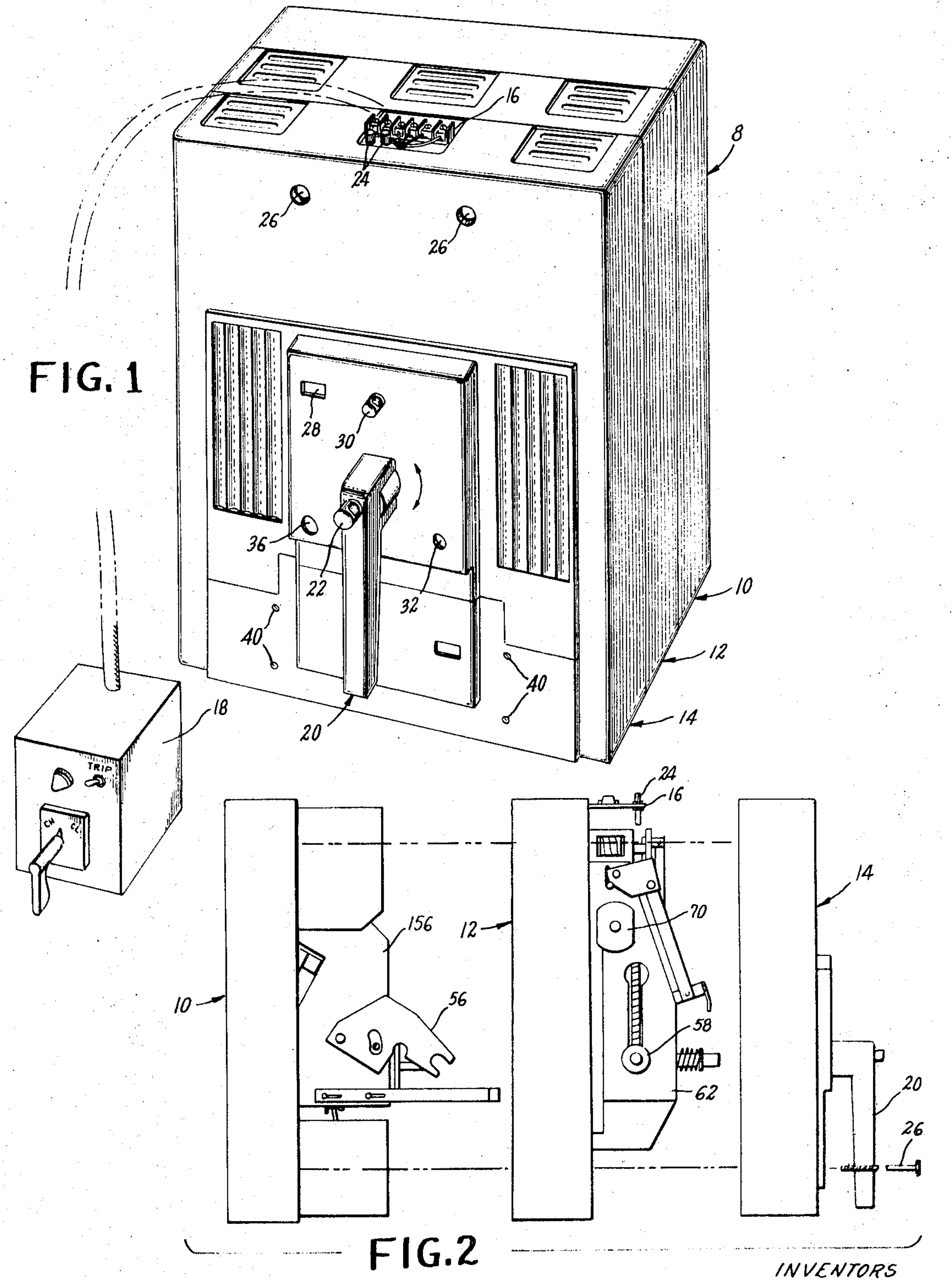
FIG. 1 is a perspective view showing a motor-operated circuit-breaker assembly and a remote-contol unit for that assembly constructed in accordance with invention.
FIG. 2 is an exploded side-elevation view of the motor-operated circuit-breaker assembly shown in FIG. 1.

While the operating mechanism of the present invention is suitable for charging springs and, more specifically, for charging springs of switching devices, it is specially suited for large circuit breakers. With reference to FIGS. 1 and 2, an electric circuit breaker 8 comprising three subassemblies which are identified as a base assembly 10, a power unit assembly 12, and a cover assembly 14. The power unit assembly 12 is provided with a terminal strip 16 for optional connection of a remote-control device 18 which is capable of sending appropriate electrical signals which will cause the circuit breaker to charge, that is, assume a position where it is "cocked" preparatory to closing the circuit breaker 8. A manual charging handle 20 projecting from the cover assembly 14 may be used for manual operation of the mechanism instead of motor operation. An interlock button 22 is mounted on the manual charging handle 20. The interlock button 22 controls mechanical and electrical interlocks which prevent motor-operated charging of the mechanism concurrently with the manual operation. Motor-protection use housings 24 are also carried by the power unit assembly 12. Cover mounting screws 26 are provided to hold the cover assembly 14 to the power unit assembly 12 and to the base assembly 10. An indicator window 28 is provided in cover assembly 14 whereby a visual indication of the position of the mechanism is displayed. Controls for operating the circuit breaker 8 include "close" button 30 for closing the circuit breaker electrical contacts, "charge" button 32 for electrically charging the mechanism, and "open" button 36 for opening the circuit breaker electrical contacts. A trip unit plate 38 mounted with screws 40 is provided for access to the trip-unit portion of the mechanism.

The open button 36, by appropriate mechanical linkage to be described more fully, trips the circuit breaker and opens the contacts. A lever 56 pivotally mounted on a housing 156 is utilized during motor-operated charging of the mechanism as will be described hereafter in greater detail. The lever 56 is engaged by roller 58 of the power-unit assembly.

Figure 3:
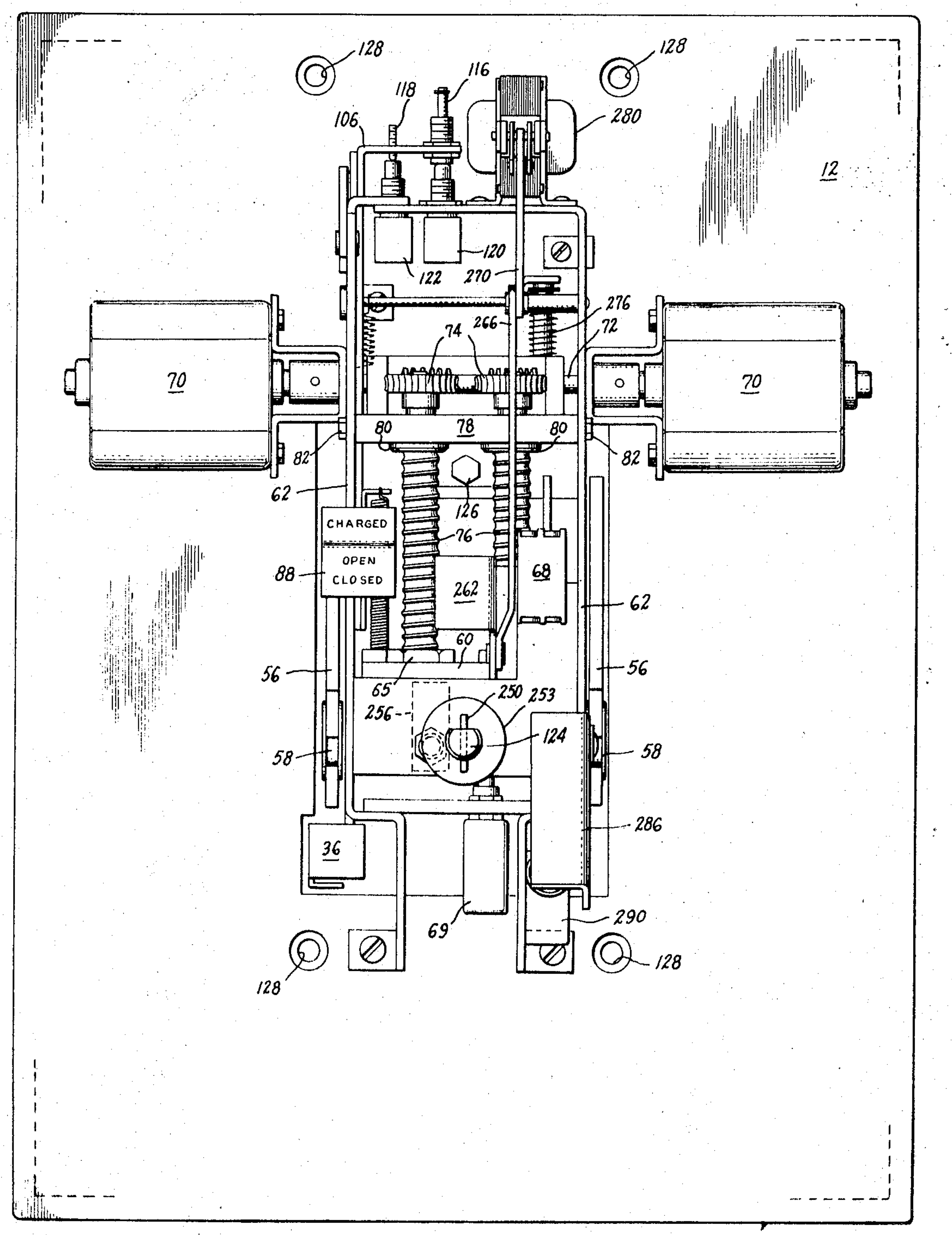
FIG. 3 is a front-elevation view of a portion of the mechanism incorporated in the circuit breaker shown in FIG. 1.
Figure 4:
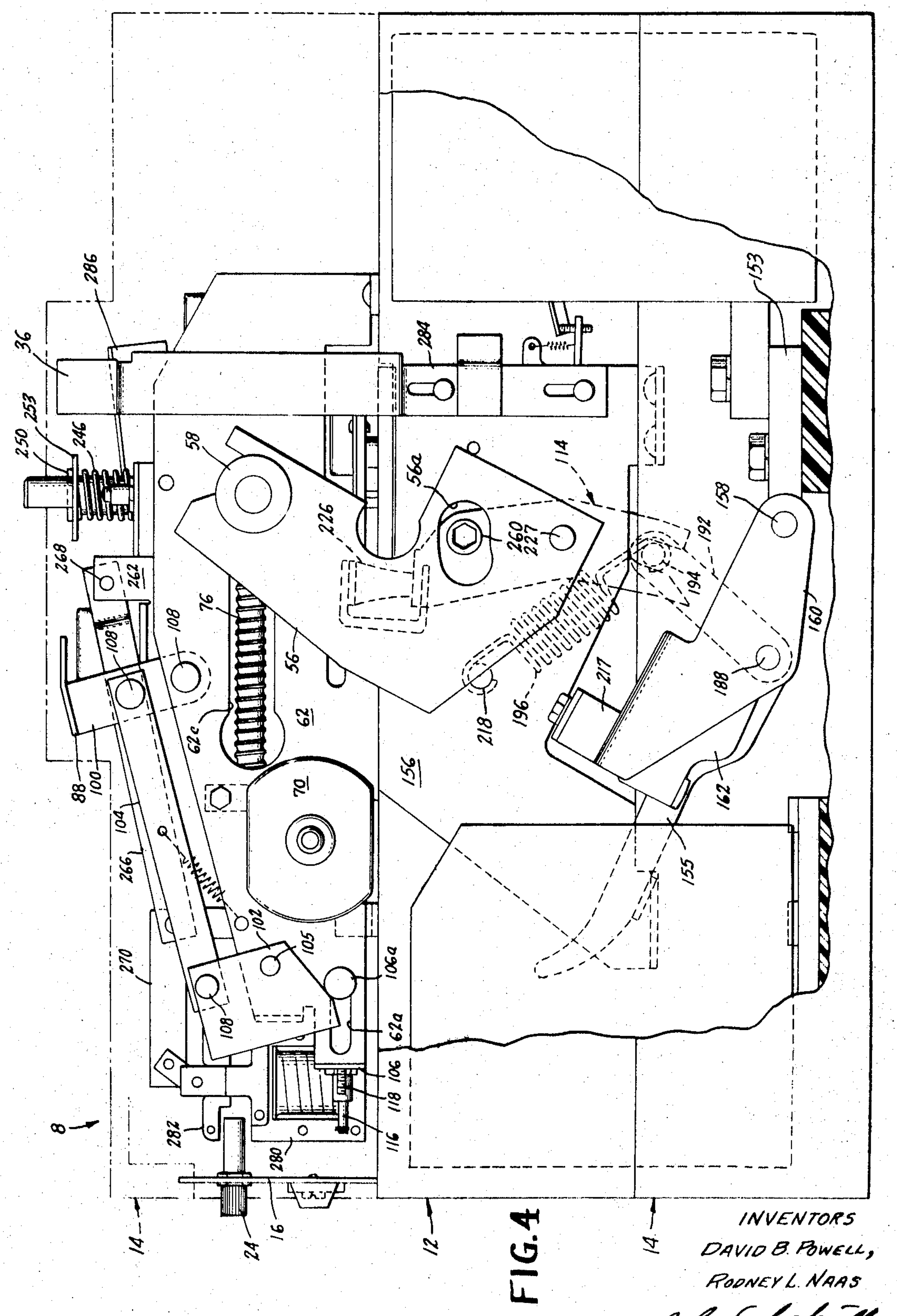
FIG. 4 is a side-elevation view of the circuit breaker shown in FIG. 1, a portion of the enclosing casing being shown only in dotted line outline, and another portion being broken away, to better show the operating mechanism.
Figure 5:
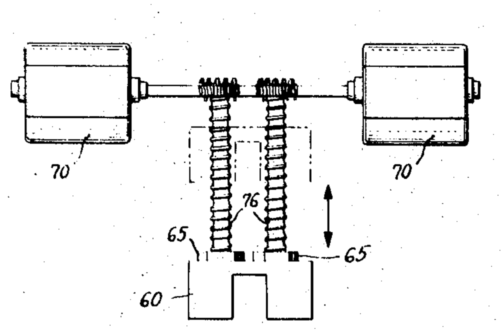
FIG. 5 is a view of portions of the operating mechanism of the circuit breaker, showing in greater detail the motor-drive portion together with the spring-charging slide and in phantom a different position of the spring-charging slide.
Figure 6:
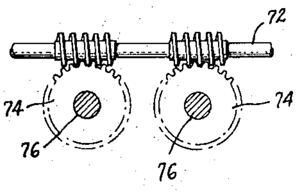
FIG. 6 is a view of a detail portion of the mechanism shown in FIG. 5 showing the relationship of the gear portions more clearly.
Figure 7:
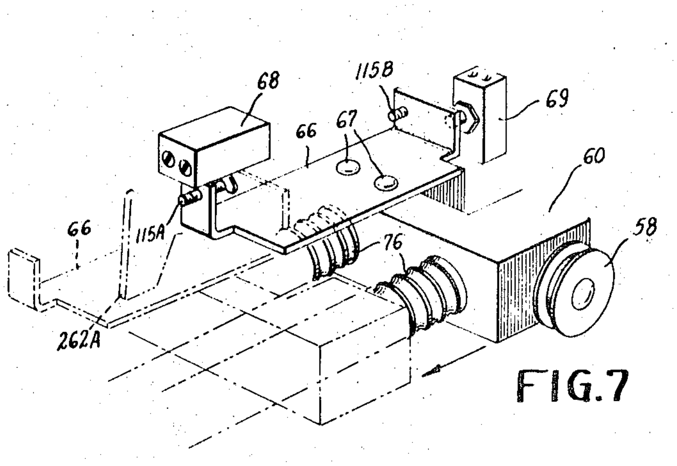
FIG. 7 is a perspective view (partially in phantom) of a portion of the mechanism shown in FIG. 3, showing the relationship of the charging slide and two electrical switches associated therewith.

Referring to FIGS. 2, 3 and 4, the roller 58 is mounted on a carriage 60 which is constrained in part by slot **62*c* of frame 62 to move in a rectilinear path. Frame 62, a metallic structure, is rigidly secured to molded plastic enclosure 63 which is part of power unit assembly 12. FIG. 7 shows alternate positions of carriage 60 on ball screw 76. The rotatable mounting of roller 58 on carriage 60 is shown in this figure. To simplify the drawing, the ball nut 65, which rotatably engages ball screws 76 shown in FIG. 3, is not shown in FIG. 7. Striker plate 66 is rigidly attached to carriage 60 by means of screws 67. As striker plate 66 moves with carriage 60 on ball screws 76, the plate 66 contacts switch 69. Bolts 115A and 115B carried by striker plate 66 actuate switch 68** in a similar manner with the movement of the carriage.

Referring now to FIG. 3, 4, 5, 6, and 7, the drive mechanism for carriage 60 comprises two electric motors 70 which are coupled to a common drive shaft 72 provided with worm gear portions. As shown most clearly in FIG. 6, the worm gear portions of drive shaft 72 engage two disc type gears 74. The gears 74 are attached respectively to two ball screws 76 which are rotatably mounted in mounting plate 78. Axial movement of ball screws 76 is prevented by thrust bearings 80 carried by mounting plate 78. Although not shown for clarity reasons, thrust bearings 80 are carried by both sides of mounting plate 78. Mounting plate 78 is rigidly attached to frame 62 by bolts 82.

Figures 8, 9:
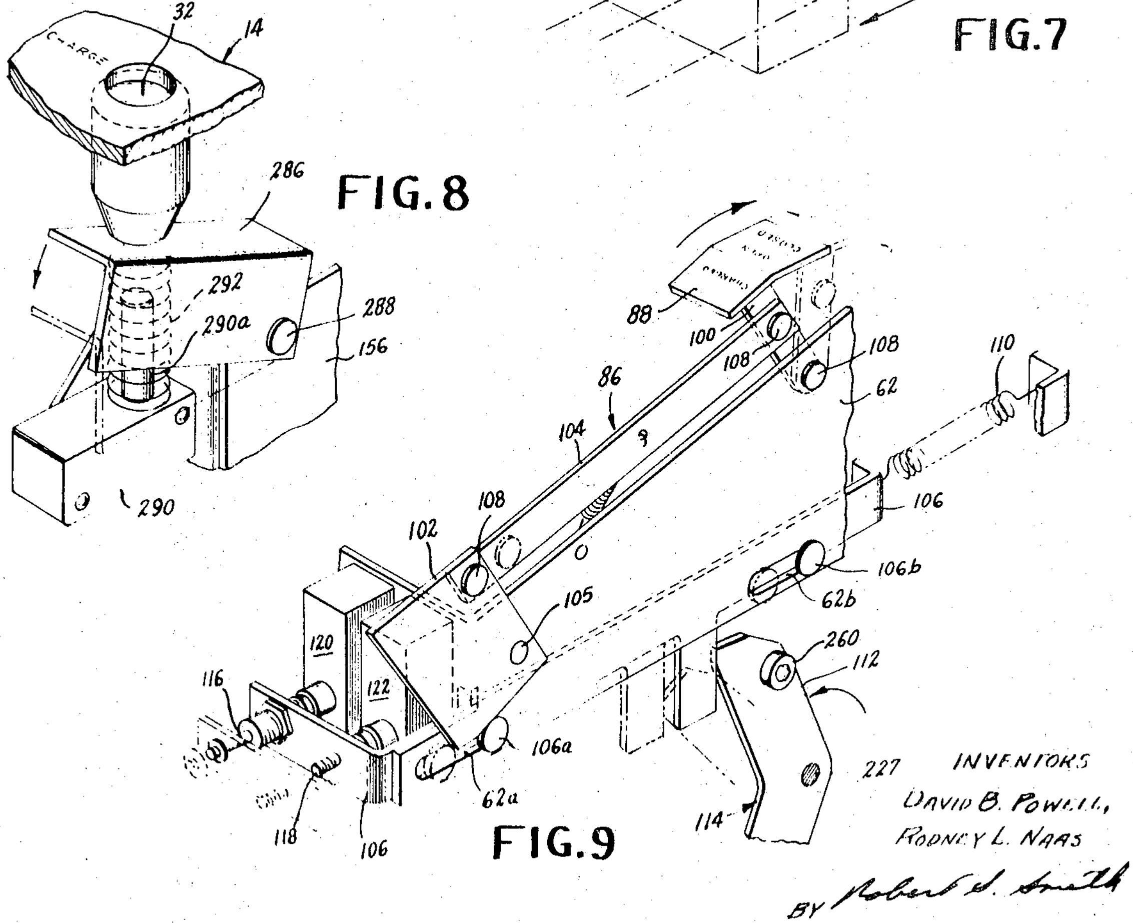
FIG. 8 is a fragmentary perspective view (partially in phantom) of a portion of the circuit breaker shown in FIG. 1 showing the relationship between an external push button and an internal switch for use in electrically charging the spring mechanism.
FIG. 9 is a perspective view of a portion of the operating mechanism shown in FIGS. 2 and 4, showing the position of the indicator subassembly with the breaker closed and in phantom the position with the breaker charged, i.e., hooked and latched.
Figure 10:
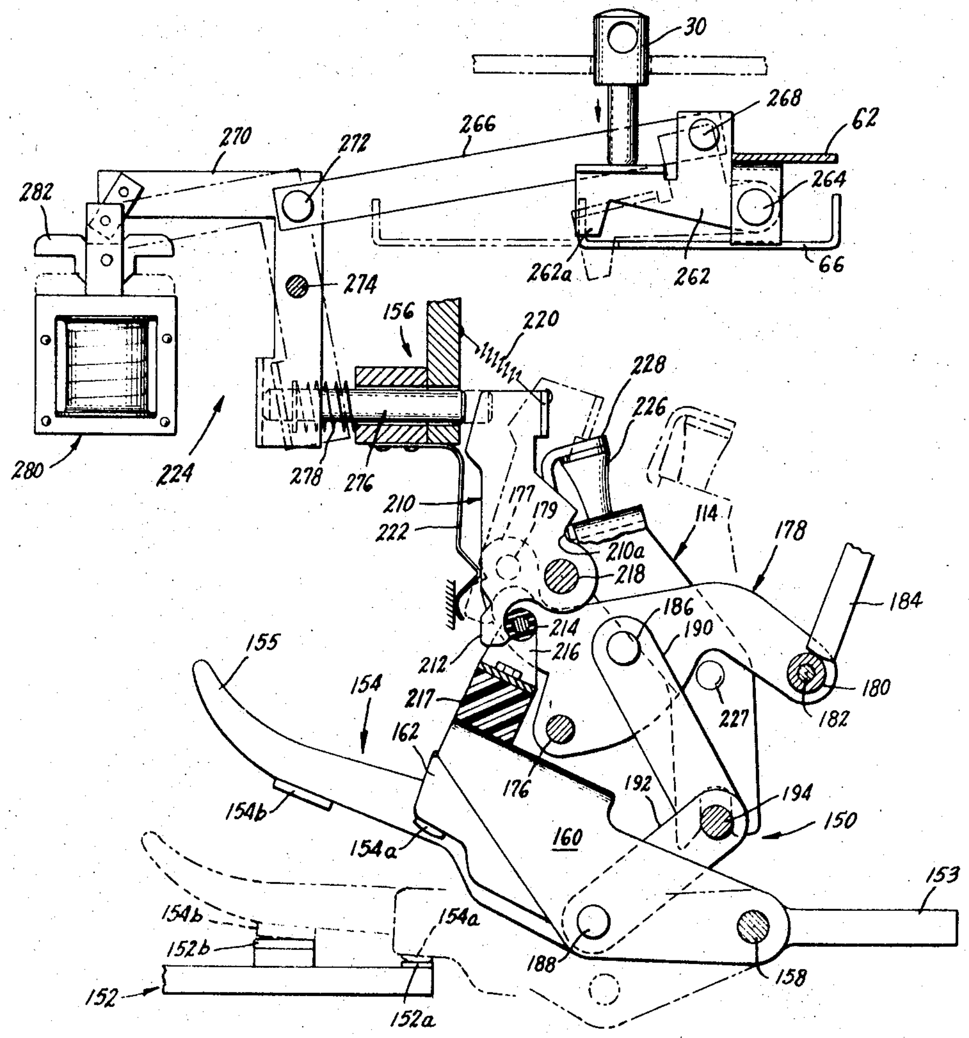
FIG. 10 is a view of a portion of the operating mechanism of the circuit breaker of FIG. 1 which in part is also shown in FIG. 4, with a portion in phantom to indicate alternate positions of the parts.
Figure 12:
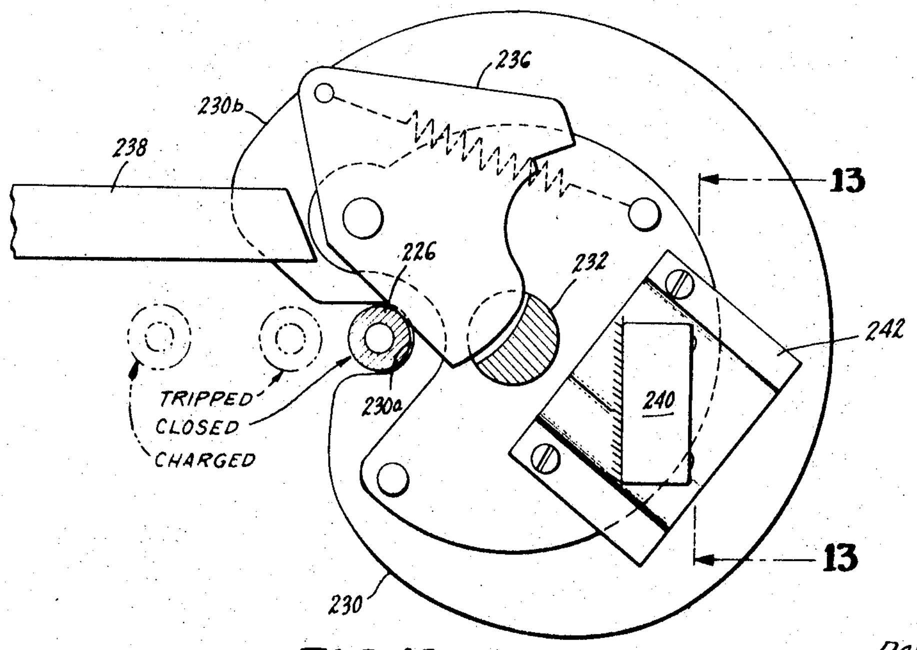
FIG. 12 is a view partially in section of a portion of the operating mechanism of the circuit breaker showing the cam used for manual charging of the spring subassembly and showing relative positions of reset lever 114 during the three discrete operational positions.

Referring now to FIG. 9, position indicator assembly 86 is used to give a visual display as to the position of the operating mechanism. Face plate 88 has portions marked respectively charged, open, and closed. One of these portions is displayed at indicator window 28 of cover assembly 14. Face plate 88 is rigidly attached to link 100 which is pivotally mounted on frame 62 of power-unit assembly 12. Similarly, plate 102 is pivotally mounted on frame 62. Link 104 connects link 100 and plate 102 so that similar arcuate paths are described by link 100 and plate 102 when plate 102 is rotated about pin 105, which secures it to frame 62, by the impingement of boss **106*a* of position indicating rod or slide 106. Suitable pins 108 are provided for the pivotal connection of plate 102 and link 104, link 100 and link 104, and link 100 and frame 62. Position indicating rod 106 is slidably mounted with respect to frame 62 by means of boss 106*a* and boss 106*b* which are constrained to travel a rectilinear path by slots 62*b* and 62*c* of frame 62. Spring 110 is secured to the position indicating slide 106 and a suitable fixed point of the structure to bias the position indicating rod to the right as viewed. Leg 112 of pivotally mounted reset lever 114 bears on position indicating slide 106. Reset lever, generally identified as 114 in FIGS. 4, 10, and 12, is carried by fixed structure on base assembly 10. As best shown in FIG. 12, the position of reset lever 114, having roller 226 pivotally attached to its end position, is indicative of the position of the mechanism. This position is transmitted through leg 112 to the postion indicating slide 106 to plate 102 to link 104 to link 110 and plate 88. The portion of plate 102 that abuts boss 106*a* is contoured to provide three discrete portions corresponding to the three discrete portions of face plate 88. The view shown in FIG. 9 shows the relationship of the parts when the breaker 8 is closed. The phantom view is of the parts in the charged position, i.e., the cradle 178 is hooked and latched. A different, intermediate position also occurs when the breaker 8 is open. The movement of position-indicating slide 106 also positions switch striker pin 116 and switch striker pin 118. Pin 116 may be of a spring-loaded type whereby longitudinal travel of the pin is allowed to provide additional overtravel or it may be of the type shown for pin 118 having only a threaded shaft to allow for longitudinal adjustment of the pin with respect to the position indicating rod 106. Switch striker pins 116 and 118 actuate respectively switches 120 and 122.**

Other aspects shown in FIG. 3 are the handle shaft 124 which carries handle 20 which is used for manual charging of the circuit breaker. Retaining nut 126 secures the power-unit assembly 12 on the base assembly 10. Holes 128 are also provided in power-unit assembly for mounting purposes.

FIG. 10 shows the construction of the basic toggle mechanism 150. Fixed contacts 152 and movable contacts 154 are provided for making and breaking the circuit. The positioning and mounting of the contacts 152 and 154 result in portions **154*b* and 152*b* making the first contact when the contacts are closing and making the last contact when the contacts are opening. This is done to provide optimum arc suppression characteristics. Portions 154*a* and 152*a* of contacts 154 and 152 make the last contact when the contacts are closing and are the first to break when the contacts are opening. Movable contacts 154 are mounted on contact arm 155 which is pivotally mounted on conductor 153 by pin 158. Conductor 153 is carried by enclosure 157. Housing 156 is a metallic structure mounted on the molded plastic enclosure 157 which is part of base assembly 10. For convenience, the construction of a single-pole chamber of the circuit breaker 8 is shown and will be described in detail although it will be understood that the circuit breaker 8 generally includes 3 pole chambers, all substantially identical except that the center pole chamber contains the major portion of the operating mechanism. U-shaped bracket member 160 is also pivotally mounted by pin 158 on conductor 153. Bracket member 160 overlies the contact arm 155 carrying contact 154*b* and also contact arm 162 carrying contact 154*a*. Suitable biasing means (not shown) are provided between the bracket and member 160 and contact arms 155 and 162 resiliently limiting movement of arms 155 and 162** in the clockwise direction as viewed.

Pivotally mounted on the housing 156 by pin 179 is the pivoted end portion 177 of the releasable member or cradle generally designated by the numeral 178. The opposite end of the releasable member 178 carries a roller 180 which is rotatably mounted thereon by means of pin 182. The roller 180 engages a latch 184 in a manner to be more fully described hereinafter. The cradle 178 and bracket member 160 are connected by the pivot pins 186 and 188 to the toggle linkage provided by the toggle links 190 and 192 which are pivotally connected to each other by the knee pin 194. The toggle linkage is biased toward the straightened condition by a pair of tension springs 196 (one of which is shown in FIG. 4 in phantom and one is located directly behind the first). The tension springs 196 are engaged by the knee pin 194 at one end and attached to pin 218 fixedly carried by the housing 156 at the other end.

The ends of the tension springs are thus positioned so that the center line of the tension springs 196 is located to the left as viewed of a line between pins 186 and 188. Thus, the springs bias the toggle links 190 and 192 to the left as viewed or toward the fixed contact 152 particularly when the toggle links 190 and 192 are in a collapsed position as shown in FIG. 10. Although the bias action of springs 196 tend to bias the knee pin 194 to the left as viewed, the toggle links 190 and 192 will not pass over center, that is, past the aligned position because pin 176 carried by cradle 178 prevents movement beyond that point. The bias action of spring 196 also is transmitted through knee pin 194, toggle link 190, pin 186, and cradle 178. This bias force tends to rotate cradle 178 counterclockwise around pin 179 (FIG. 11) which rotatably secures the cradle to housing 156. The movement of the spring bias holds roller 182 against the latch 184.

Referring now to FIGS. 4, 10, 12, and 17, the relationship of hook 210 to cradle 178 will now be seen. Hook 210 is pivotally mounted on housing 156 and end portion 212 engages roller 214 rotatably mounted on bracket assembly 216 which is rigidly mounted on cross bar 217 rigidly attached to bracket 160. The pivotally mounting of hook 210 to housing 156 is by means of pivot pin 218. Hook 210 is biased counterclockwise by coil spring 220 which is rigidly attached to hook 210 and housing 156. Leaf spring 222 is rigidly attached to housing 156 and is provided for the purpose of providing a detent for hook 210 so that when hook 210 is rotated to release roller 214, hook 210 will remain in that rotated position so that it will not interfere with further movement of roller 214, such as when the breaker 8 is subsequently opened. The bias action of spring 220 on hook 210 may be overridden by the closing mechanism generally designated at 224 which will be described more fully later. Alternatively to this construction hook 210 may be contoured and biased so that it engages roller 214 immediately upon tripping of the circuit breaker.

Figures 17, 18, 19:
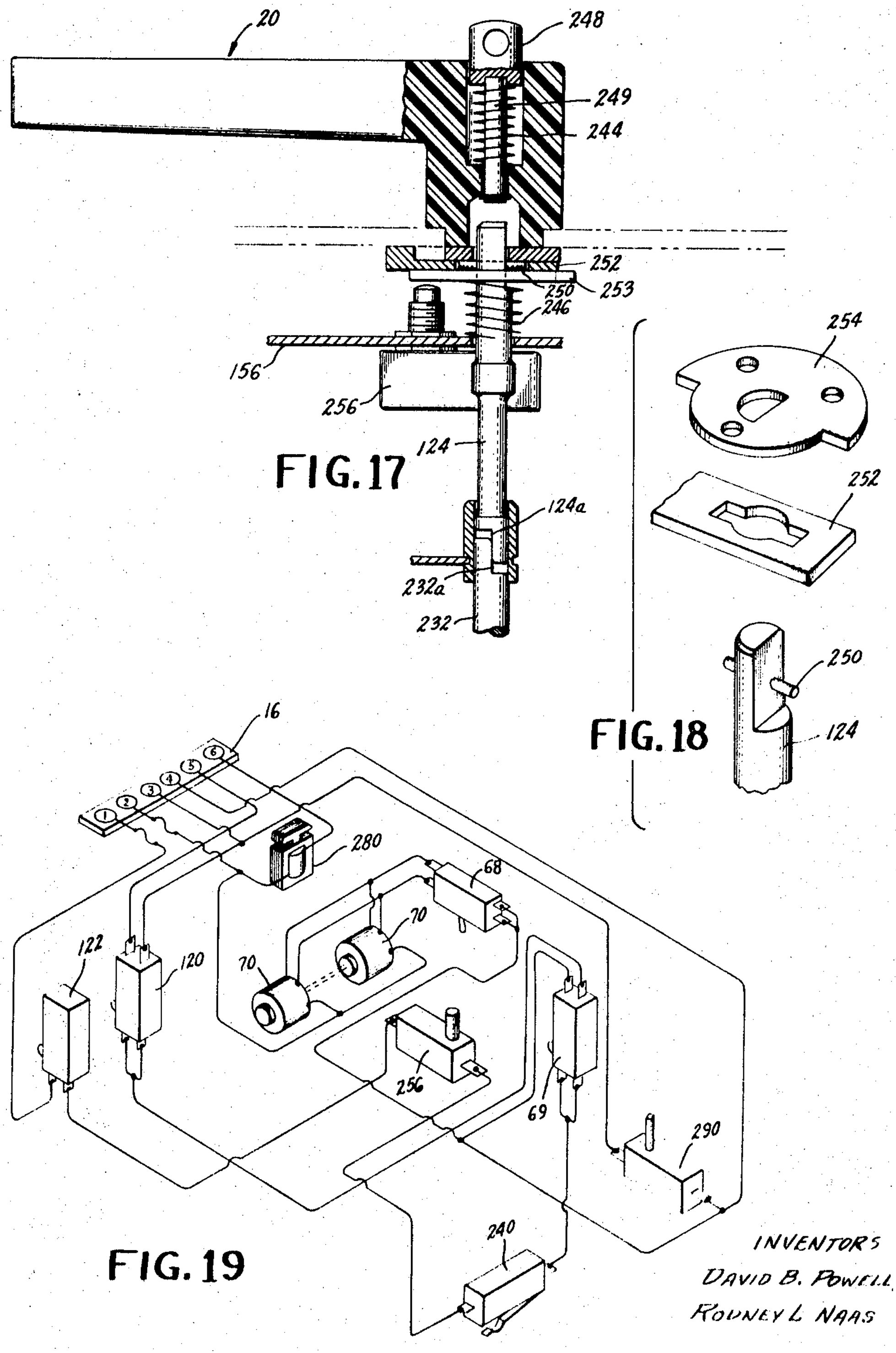
FIG. 17 is a view partially in section of a portion of the circuit-breaker operating mechanism showing the electrical and mechanical interlocks provided to insure against concurrent mechanical and electrical operations.
FIG. 18 is a detail exploded perspective view showing a portion of the mechanism shown in FIG. 17.
FIG. 19 is a perspective partly schematic view showing the physical relationship of the switches, motors, and solenoids within the circuit breaker as schematically represented in FIGS. 14, 15, and 16.

The relationship of the parts during manual charging of springs 196 can best be seen by reference to FIGS. 4, 10, 11, 12, and 17. Much of the mechanism utilized for charging the springs 196 is also used during motor-operated charging procedures; however, this will be treated separately. To charge the circuit breaker 8, it is necessary to rotate toggle links 190 and 192, stretching tension springs 196 and rotating cradle 178 so as to move from the position shown in FIG. 11 to the phantom position of FIG. 11, also shown in FIG. 10, against latch 184, and engage roller 214 with hook 210. Roller 214 is rotatably carried by bracket assembly 216 which is rigidly mounted on crossbar 217 which rigidly connects three members 160 corresponding to each of the three electrical poles. During manual operation, the force to stretch tension springs 196 and rotate toggle links 190 and 192 is applied to knee pin 194 by reset lever 114 which is pivotally mounted on housing 156 by pivot pin 227. Roller 226 is rotatably mounted on reset lever 114 by bracket 228 which is rigidly secured to the reset lever 114. To move knee pin 194 to the position shown in FIG. 10, reset lever 114 must be rotated counterclockwise. Manually, this is accomplished by repetitive arcuate strokes of handle 20 which by suitable mechanism rotates a circular cam 230 shown in FIG. 12. Cam 230 is rigidly mounted on shaft 232 rotatably carried by frame 62. Reset level 114, roller 226 is positioned by the cam during manual operation of the mechanism. When the springs 196 are holding the breaker contacts 152 and 154 closed, the roller 226 is positioned in the throat **230*a* of cam 230 and exerts no real force against the cam surface. When the contacts 152 and 154 open, roller 226 moves radially out from the throat 230*a* of cam 230 and comes to rest in the position identified as "tripped." As cam 230 is rotated clockwise as viewed in FIG. 12, roller 226 bears on the periphery of 230. Before the maximum radius of cam 230 is reached at surface 230*b*, reset lever 114 is rotated counterclockwise sufficiently to force roller 180 into position under latch 184. As best seen in FIG. 10, the counterclockwise rotation of reset lever 114 causes impact of bracket 228 against surface 210*a* of hook 210 which rotates hook 210 counterclockwise and away from the detent of leaf spring 222. Hook 210 under the bias of spring 220 will move into the hooked position under roller 214. Continued rotation of cam 230 results in further movement of roller 180 away from latch 184 to assure engagement. If for some reason latch 184 is restrained from moving into position to support roller 180, roller 226 will follow the periphery of cam 230 into throat 230*a* to the "tripped" position as cam 230 is rotated clockwise. If latch 184 is in the normal position to support roller 180, continued rotation of cam 230 past its maximum position will permit reset lever 114 to pivot very slightly toward cam throat 230*a*. As this occurs, tension springs 196 will first cause cradle 178 to rotate counterclockwise until roller 180 contacts and is supported by latch 184. Pivot pin 186 now becomes a fixed point and tension springs 196 now provide bias force to rotate links 190 clockwise and 192 counterclockwise forcing contact arms 162 to rotate counterwise to the breaker closed position. Only a slight rotation can occur, however, before hook 210 catch roller 214 and mechanism is held in a static condition with springs 196 stressed. Closing of breaker contacts 152 and 154 can then be initiated by the closing mechanism generally designated as 224 which will be described more fully hereafter. To prevent impacting of the roller 226 on the cam surface 230 during closing, lever 238 and plate 236 are provided to insure alignment of cam throat 230*a* with the path of the roller 226 during closing of contacts 152 and 154. Switch 240, rigidly mounted on housing 156 not show in FIG. 12 for clarity, is used for electrical indication of the position of the cam. Arm 240*a* of the switch 240 is held up by ramp surface 242 rigidly mounted on cam 230 to permit electric charging operation only if the cam is in the position shown in FIG. 12. The sectional view in FIG. 13 best shows the action of arm 240*a*. Referring now to FIGS. 17 and 18, the mechanism for rotating the cam 230 will now be seen. Shaft 232 is connected to cam 230. Shaft 124 is connected to shaft 232 by means of a spline or interleaved overlapping flat faces 124*a* and 232*a* which transmit rotational forces while allowing longitudinal displacement of shaft 124. In the static condition, springs 244 and 246 respectively hold button 248 and shaft 124 in the up position as viewed. By pushing on button 248, the bias of springs 244 and 246 can be overridden and handle 20 can then be rotated. If button 248 is not first depressed, pin 250 rigidly mounted in shaft 124 engages an elongated opening in plate 252 and rotation is not possible. Plate 252 is secured to the cover 14 as is plate 254 which limits the maximum upward movement of shaft 124 since its opening is smaller than the pin 250. Switch 256 rigidly secured on housing 156 is used for electrical interlock purposes to prevent electrical charging operation when button 248 is depressed for manual operation. When button 248 is depressed, shaft 249 rigidly attached thereto moves down to strike handle shaft 124 slidably mounted for longitudinal movement with respect to housing 156 and washer 253 rigidly mounted on shaft 124 strikes the actuating button of switch 256** to complete actuation.

Figure 11:
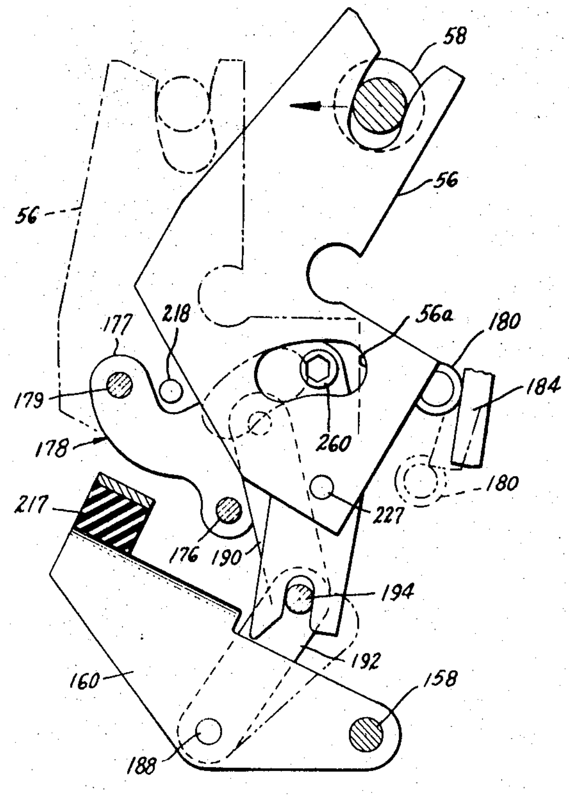
FIG. 11 is a side-elevation view of a portion of the operating mechanism also shown in FIG. 4, showing the toggle linkage and a portion of the motor-operated charging slide with alternate positions shown in phantom.

In accordance with the present invention, electric motor operation of this type of mechanism is achieved by causing lever 56 to move reset lever 114 directly as best shown in FIG. 11, instead of using cam 230 driving roller 226 for this purpose as in the manual operation. Lever 56 is pivotally mounted on the same pivot pin 227 as ried by level 114. Slot 56A of lever 56 engages the internal hexagonal drive socket head of screw 260 which is carried by lever 114. Rooler 58 engages the bifurcated end of lever 56 and as roller 58 describes the rectilinear path previously described, lever 56 is pivoted about pin 227 forcing reset lever 114 against knee pin 194 to charge the mechanism as previously described. Roller 180 moves to the position shown in phantom where it is restrained by latch 184 and hook 210 is reset as also previously described.

Referring now to FIG. 10, mechanism is provided for closing the circuit breaker after the springs 196 have been charged and the hook 210 and latch 184 engaged. Manual closing is accomplished by depressing button 30 which rotates lever 262 which is pivotally mounted on housing 156 by pin 264. Link 266 which is pivotally mounted on lever 262 by pin 268 is forced to the left as viewed by this operation. Lever 270 is pivotally connected to link 266 by pin 272. Lever 270 is in turn pivotally mounted to housing 156 by pin 274. Accordingly, a movement of link 266 to the left as viewed rotates lever 270 in a counterclockwise manner. This rotation causes impingement of lever 270 on the pin 276 which is slidably mounted in housing 156. Spring 278 is provided between housing 156 and lever 270 to bias lever 270 in a clockwise direction. Movement of pin 276 to the right causes impingement of pin 276 on hook 210 and clockwise rotation of hook 210 about its mounting pin 218, releasing roller 214 which, in turn, allows movement of crossbar 217, rotation of bracket 160 and associated contact arms 155 and 162 about pivot pin 158, and alignment of toggle links 190 and 192 as the contacts 154 and 152 close.

The closing of the contacts 154 and 152 can also be accomplished electrically by operation of solenoid 280. Energization of solenoid 280, such as by remote control device 18, causes armature 282 slidably mounted within solenoid 280 to move downwardly. Armature 282 is pivotally connected to lever 270 and therefore lever 270 rotates counterclockwise about its pin 274 as described with respect to manual operations. The rest of the closing operation is identical. Referring now to FIG. 4, open button 36 is connected to trip rod 284 which is slidably mounted to housing 156 by suitable mechanism now shown here for clarity. The related portions of latch 184 are omitted for clarity. Latch 184 is deflected to open contacts 152 and 154. The deflection may be by means of the linkage for manual operation associated with open button 36 for automatic operation if an overcurrent condition exists or by shunt trip or other applicable remote opening means.

The counterclockwise pivoting of lever 262, which occurs in either the manual or electric operating modes described above, positions elongated portion 262*a* adjacent striker plate 66 as best shown in FIG. 10. If carriage 60 is in any position away from its extreme right position as shown, the elongated member 262*a* will strike the top of striker plate 66 and button 30 cannot be depressed. This mechanical restraint is provided to prevent the closing of the contacts 152 and 154 if the carriage 60 has not moved sufficiently to prevent interference of the parts involved in the closing operation.

Initiation of electrical-charging operation is by means of the mechanism shown in FIG. 8, button 32, which is slidably mounted by suitable means with respect to cover assembly 14, which also has an aperture to allow access to button 32. Button 32 impinges upon lever 286 which is pivotally attached by pin 288 to housing 156 which is part of power unit assembly 12. Lever 286 in turn bears on the actuating rod portion 290*a* of switch 290 which is rigidly secured to housing 156. Lever 286 is biased to the up position as viewed by spring 292. The purpose of lever 286 is to provide for misalignment between button 32 and switch plunger 290*a* which could occur due to manufacturing tolerances since charge button 32 is part of cover assembly 14, and switch plunger 290*a* is part of power unit assembly 12. Accordingly, depression of charge button 32 moves suitable contacts within the switch 290 to electrically charge circuit breaker 8.

Referring now to FIGS. 14, 15, 16, and 19, the electric control and operational circuitry will best be seen.

Figure 14:
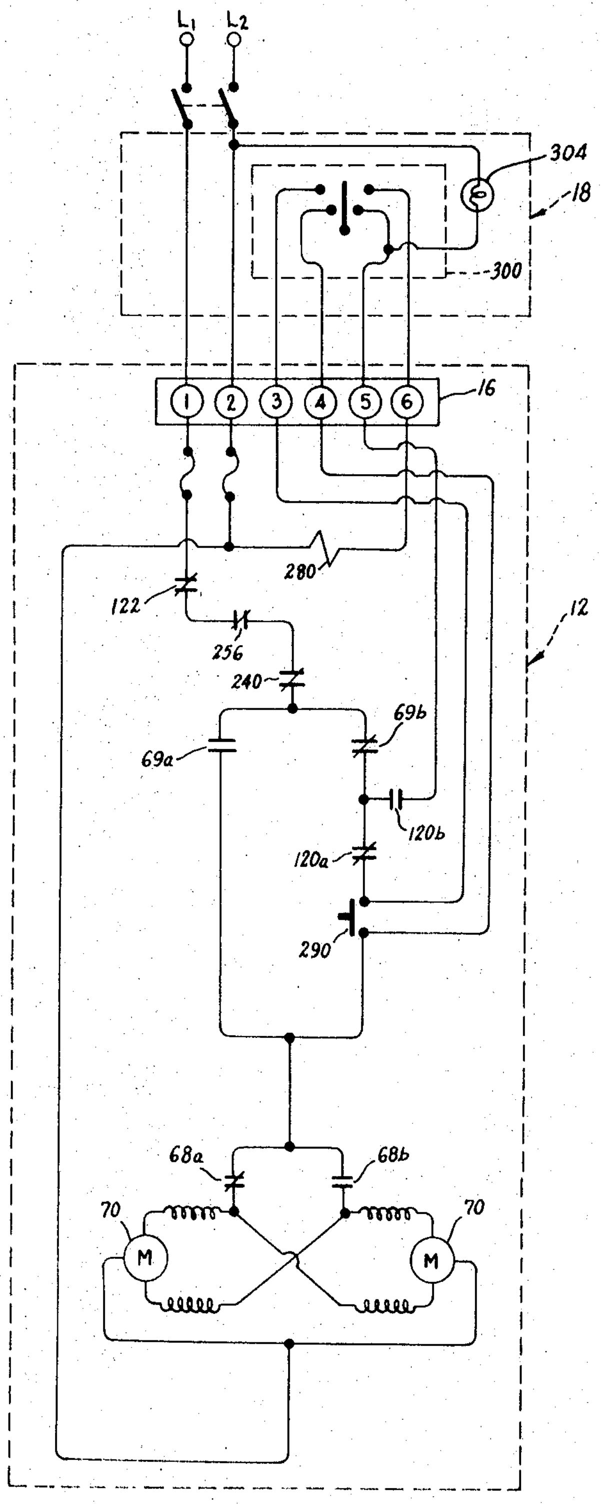
FIG. 14 is a schematic circuit diagram showing the condition of the switching circuitry incorporated in the circuit breaker when the circuit breaker is open.

Switch 68, also known as the motor-direction control switch, shown in FIGS. 3 and 7, is a single-pole, double-throw, toggle switch. The purpose of switch 68 is to reverse the direction of motors 70. It is actuated by bolts 115A and 115B carried by striker plate 66 mounted on carriage 60. As the carriage 60 reaches either its extended or retracted position, the motor-direction control switch is operated. Since it is bi-stable, the switch contacts will remain in the position determined by its last operation despite some additional movement of carriage 60. The contacts 68*a*, as represented in FIG. 14, go to the closed position and the contacts 68*b* go to the open position when carriage 60 travels to the retracted position shown in FIG. 7 where bolt 115A has actuated switch 68. The contacts 68*a* move to the open position and 68*b* to the closed position when the carriage 60 moves to the extended position shown in phantom in FIG. 7 where bolt 115B has actuated switch 68.

Switch 69, also known as the carriage-retracted cutoff switch, is a momentary single-pole, double-throw switch shown in FIGS. 3 and 7. The purposes of switch 69 are to (a) "seal in" the motor circuit to insure completion of a changing cycle once it is started and (b) insure that motors 70 have power turned off prior to switching of motor rotation direction by switch 68. It is operated by striker plate 66 carried by carriage 60. When striker plate 66 abuts against the operating plunger of switch 69, the contacts identified as 69*a* are open and the contacts identified as 69*b* are closed. When carriage 60 is extended and striker plate 66 no longer bears on the operating plunger of switch 69, the contacts 69*a* are closed and contacts 69*b* are open.

Switch 120, also known as the mechanism-latched-and-hooked sensing switch, shown in FIGS. 3 and 9 is a single-pole, double-throw momentary contact switch. The purpose of switch 120 is to electrically arm either (a) closing solenoid 280 when the circuit breaker 8 is charged and ready to close contacts 152 and 154 or (b) the motor circuit supplying power to motors 70 when the cradle 178 is in the unlatched position. When rollers 214 and 180, carried respectively by crossbar 217 and by cradle 178, are engaged respectively by hook 210 and latch 184, toggle links 190 and 192 and knee pin 194 will assume a particular position. This position, in turn, determines the position of pivotally mounted reset lever 114 which, in turn referring to FIG. 9, affects the position of leg 112 of reset lever 114 and position indicating rod 106 carrying switch striker pins 116. When cradle 178 is latched and crossbar 217 is hooked, position indicating rod 106 is in the position shown in phantom in FIG. 9, contacts represented as 120*a* are in the open position, and contacts 120*b* are in the closed position. When position indicating rod 106 moves to the far right as viewed in FIG. 9 (breaker "open" position), away from the aforementioned position, contacts 120*a* are in the closed position, and 120*b* are in the open position. Stated another way, the contacts of switch 120 are in the former position at all times except when the reset arm 114 is in the breaker closed or tripped positions as shown in FIG. 12.

Switch 122, also known as the trip-indication sensing switch, shown in FIGS. 3 and 9, is a single-pole, single-throw, normally closed momentary switch. The actuation of switch 122 is very similar to that of switch 120 except that it operates after switch 120 as the breaker closes. The travel of position indicating rod 106 corresponds to the travel of reset lever 114 as shown in FIG. 9 which, as noted previously, has a distinct position for the charged, closed, or tripped breaker condition. When the cradle 178 is in the breaker closed position, that is, when latch 184 restrains roller 180 and contacts 152 and 154 are closed, the contacts of switch 122 are open. At all other times, the contacts of switch 122 are closed.

Figure 13:
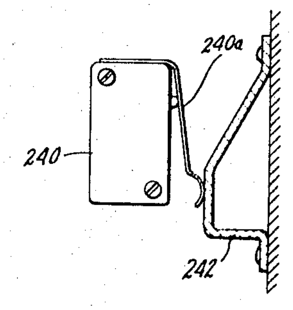
FIG. 13 is a view partially in section of a portion of the mechanism shown in FIG. 12 taken along the line 13—13 of FIG. 12.

Switch 240, also known as the correct cam-position sensing switch, shown in FIGS. 12 and 13, is a single-pole, single-throw momentary normally open switch. Arm portion 240*a* is depressed by striker plate 242 if the angular position of cam 230 is such that throat 230*a* of cam 230 is in alignment with roller 226 of reset lever 114. When there is alignment, the arm 240 is deflected toward the body of switch 240 and the contacts of switch 240 are closed. When alignment does not exist, arm 240*a* is not deflected and the contacts of switch 240 are open. This switch prevents electrical charging operation if manual charging operation is once started. Beginning manual charging operation rotates cam 230 which opens the contacts of switch 240. Complete charging can thereafter be accomplished only by manual means. This protection is necessary to prevent electrical charging and subsequent closing which would cause damaging impingement of roller 226 against cam surface 230.

Switch 256, also known as the correct-handle-position-sensing switch, shown in FIGS. 3, 4, and 17, is a single-pole, single-throw, normally closed, momentary switch. When manual-charging button 248 is depressed to allow rotation of cam 230 by handle 20, shaft 124 is depressed along with pin 250 and washer 253. The washer 253 actuates the switch plunger of switch 256 again opening the electrical circuit. Continued depression of button 248 is required during each of the repetitive arcuate motions of handle 20 to allow physical clearance between pin 250 and plate 252. When washer 253 bears on switch 256. the contacts of switch 256 are open. When washer 253 returns to the position shown in FIG. 17, the contacts of switch 256 are in the closed position, but, if one arcuate motion has been completed correct cam position switch 240 will continue to maintain an open electrical circuit even though switch 256 is momentarily released.

Switch 290, also known as the charging switch, shown in FIGS. 3 and 8, is a single-pole, single-throw, normally open, momentary switch. As previously described, depression of button 32 actuates switch 290. With button 32 depressed, the contacts of switch 290 are closed. With button 32 solely biased by spring 292, the contacts of switch 290 are in the open position.

The remote control device 18 comprises a lever switch 300 provided with suitable wiring for connecting terminals marked 3 and 4 on terminal strip 16 or alternately terminals 5 and 6 on terminal strip 16. Light 304 is provided to show that the carriage is retracted and the mechanism is charged or, in other words, that the circuit breaker is ready to be closed.

The operating sequence for the circuitry and mechanism starting from breaker "open" position will now be described. The circuit is armed for motor 70 driven operation with contacts 122, 256, 240, **69*b*, 120*a*, and 68*a* closed as shown in FIG. 14. If terminals labeled 3 and 4 on terminal strip 16 are permanently connected, automatic charging will occur as soon as the breaker 8 opens. Otherwise closure of switch 290 or the remote switch 300 across terminals identified as 3 and 4 will start the motors 70. The motors 70 turn in a direction such that the right-hand lead ball screws will move the ball nuts and carriage away from the retracted position. After approximately ⅛" of carriage movement, contact 69*b* opens and contact 69*a* closes sealing in the motor circuit until the carriage 60 is fully retracted again. After some carriage travel away from the retracted position slots 56*a* in levers 56 pick up socket head screws 260 on reset lever 114 and reset lever 114 is rotated counterclockwise as viewed in FIG. 4 performing the same function as described in manual charging. At some intermediate point switch contacts 120*a* open and 120*b* close. At some later point hook 210 is forced to the hooked position. Still later the roller 180 is forced down enough for latch 184 to move into its blocking position. Then screw 115B actuates the toggle lever of switch 68 reversing direction of rotation of motors. Then after the carriage 60 starts back toward the retracted position and reset lever 114 which is biased in a clockwise direction by spring 196 follow the carriage until (a) the roller 180 contacts the latch 184 and (b) the roller 214 on the contact arm crossbar 217 is caught by the hook 210. Further movement of reset lever 114** ceases and carriage continues toward the retracted position.

At some point near the fully retracted position contact **69*a* opens and 69*b* closes shutting off the motors 70 and arming the closing solenoid 280 circuit. Inertia in the motor will cause continued motion of the carriage 60 to actuate contacts 68*a* to the closed position and 68*b*** to the open position restoring the correct motor rotation direction for subsequent charging. Continued coasting of the motors will occur but due to an overrunning feature of the ballscrews, axial carriage motion will cease.

Figure 15:
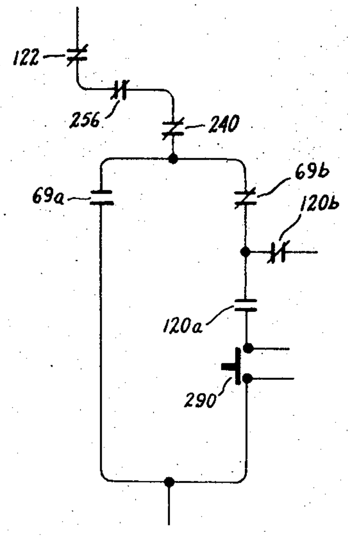
FIG. 15 is a schematic circuit diagram showing the condition of a portion of the switching circuitry when the circuit breaker is in the "charged" condition.

With these switch positions, it is impossible to restart the motors 70 as the switching circuitry is as shown in FIG. 15 with contacts **120*a* and 69*a* open but the solenoid arming circuit through switches 122, 256, 240, 69*b*, and 120*b* closed. Manual closing as described previously can now occur as striker plate 66 is in the position shown in FIGS. 7 and 10 and rotation of lever 262 due to depression of button 30** can occur.

Shorting of terminals 5 and 6 will provide automatic closing at this point. Closing of contacts of remote switch 300 across terminals 5 and 6 will complete the closing solenoid 280 circuit so breaker closing will now occur as previously described. As the breaker closes, reset lever 114 moves clockwise as viewed in FIG. 10, slide 106 moves to a corresponding position as described. At some intermediate point, switch contacts **120*a* open cutting off the solenoid 280 and 120*b* close arming the motor 70 circuit. Immediately after this occurs, switch 122 opens preventing motor 70 or solenoid 280 operation. Immediately after this, reset lever 114** comes to rest as the breaker contacts are now fully closed.

Figure 16:
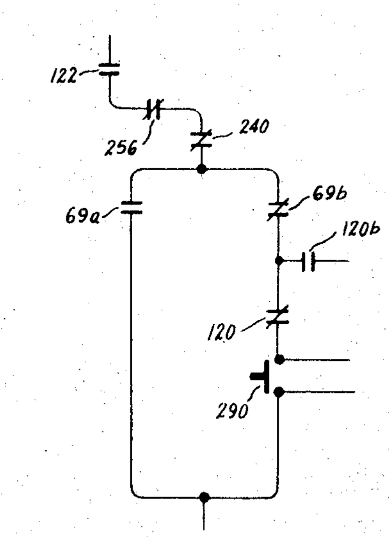
FIG. 16 is a schematic circuit diagram showing the condition of a portion of the switching circuitry when the circuit breaker is in the "closed" position.

The circuits are now as shown in FIG. 16 with switch 122 open preventing motor 70 or solenoid 280 operation. If the breaker is opened by the trip button 30, switch 122 closes and circuitry is again as shown in FIG. 14 which will permit further operation. Alternatively, with the breaker charged, springs 196 may be discharged at any time as long as terminals 3 and 4 of terminal strip 16 are not shunted for automatic charging. The switching circuitry then goes from the position shown in FIG. 15 to that in FIG. 14.

If simultaneously the breaker is manually closed, the button 30 is held down, terminals 3 and 4 are shunted for automatic recharging and the breaker contacts close on a fault, tripping occurs immediately. Striker plate 66 will push lever 262 and hence button 30 up out of the path of the plate 66 as the carriage is driven to recharge the springs.

The circuitry shown is designed for operation with alternating current. For use with direct current, a capacitor is added for arc suppression at the control switch contacts. If automatic recharging is required with direct current supply, another switch and a time delay relay is provided to delay energization of motors 70 to prevent inadvertent opening of the contacts 152 and 154 after they have initially closed.

While we have disclosed only one embodiment of our invention, it will be appreciated that many modifications thereof may readily be made by those skilled in the art. Thus, for example, driving lever 114 directly with roller 58 and eliminating the manual operation or alternatively adding suitable handle means on lever 114 and eliminating electric motor operation, or as still another alternative merely eliminating the motor drive portion, and we therefore intend by the appended claims to cover all such modifications as fall within the spirit and scope of our invention.

What we claim as new and desired to secure by Letters Patent of the United States is:

1. A circuit breaker assembly comprising:

(a) a support member providing an enclosure;

(b) a fixed contact on said support within said enclosure;

(c) a movable contact arm pivotally mounted at one end within said enclosure and having a contact surface adjacent the other end thereof for engagement with said fixed contact, said contact arm being rotatable about its pivotal mounting to a closed position with its contact in engagement with said fixed contact and to an open position away from said fixed contact;

(d) a releasable member pivotally mounted at one end within said enclosure;

(e) latch means on said support normally engaged with and holding said releasable member in latched position and operable to release said releasable member from said latched position, said releasable member when released causing movement of said contact arm to said open position;

(f) hook means on said support connected to said contact arm and engageable by said hook means to hold said contact arm in open position, said hook means being operable to release said contact arm for movement of said contact arm toward said closed position;

(g) a toggle linkage having one link pivotally connected to said releasable member intermediate the length thereof, a second link pivotally connected to said contact arm intermediate the length thereof, and a pivot pin interconnecting said toggle links, said toggle linkage being movable between straightened and collapsed conditions to move said contact arm between closed and open positions respectively;

(h) biasing means urging said toggle linkage to said straightened position when said releasable member is in said latched position and also biasing said releasable member when released to move said contact arm toward said open position;

(i) resetting means for moving said toggle linkage and releasable member against the action of said spring to engage said releasable member with said latch means in said latched position while said hook means is holding said contact arm in said open position and for releasing said toggle linkage following engagement of said releasable member with said latch means, said resetting means including a resetting member movably mounted on said support within said enclosure and engaging said toggle linkage.

2. The circuit breaker assembly as set forth in claim 1 wherein said resetting means includes first means for manual resetting and second means for electric motor drive of said resetting member.

3. The circuit breaker assembly as set forth in claim 1 wherein said resetting means is a resetting lever pivotally mounted on said support.

4. The circuit breaker assembly as set forth in claim 1 further including operating means to release said hook means from said restraining means to permit movement of said contact arm to said closed position.

5. The circuit breaker assembly as set forth in claim 1 further including means for indicating the position of the assembly.

6. The circuit breaker assembly as set forth in claim 2 wherein the said resetting member is a resetting lever pivotally mounted on said support.

7. The circuit breaker assembly as set forth in claim 2 wherein said means includes a carriage carried and constrained by said support to rectilinear motion, said carriage engaging and operating said resetting member.

8. The circuit breaker assembly as set forth in claim 2 further including operating means to release said hook means from said restraining means to permit movement of said contact arm to said closed position.

9. The circuit breaker assembly as set forth in claim 2 further including means for indicating the position of the assembly.

10. The circuit breaker assembly as set forth in claim 2 further including means for preventing simultaneous operation of said first means for manual resetting and said second means for electric motor drive of said resetting member.

11. The circuit breaker assembly as set forth in claim 3 wherein said resetting lever is bifurcated and said bifurcated portion receives said pivot pin connecting said toggle links.

12. The circuit breaker assembly as set forth in claim 6 wherein said resetting lever is bifurcated and said bifurcated portion receives said pivot pin connecting said toggle links.

References Cited

UNITED STATES PATENTS

| | | | |
|---|---|---|---|
| 951,750 | 3/1910 | Stuparich | 335—68 |
| 2,979,909 | 4/1961 | Broadbent | 200—47 |
| 3,171,920 | 3/1965 | Klein | 335—69 |
| 3,198,907 | 8/1965 | Archer | 200—47 |
| 3,343,109 | 9/1967 | Jencks | 335—26 |
| 3,425,304 | 2/1969 | Beisswenger | 74—424.8 |

OTHER REFERENCES

Ball-Bearing Screws, p. 58 of Mechanism, Linkages & Mechanical Controls by Nicholas P. Chironis, McGraw Hill, Mar. 3, 1966.

HAROLD BROOME, Primary Examiner

U.S. Cl. X.R.

200—153